UNITED STATES PATENT OFFICE.

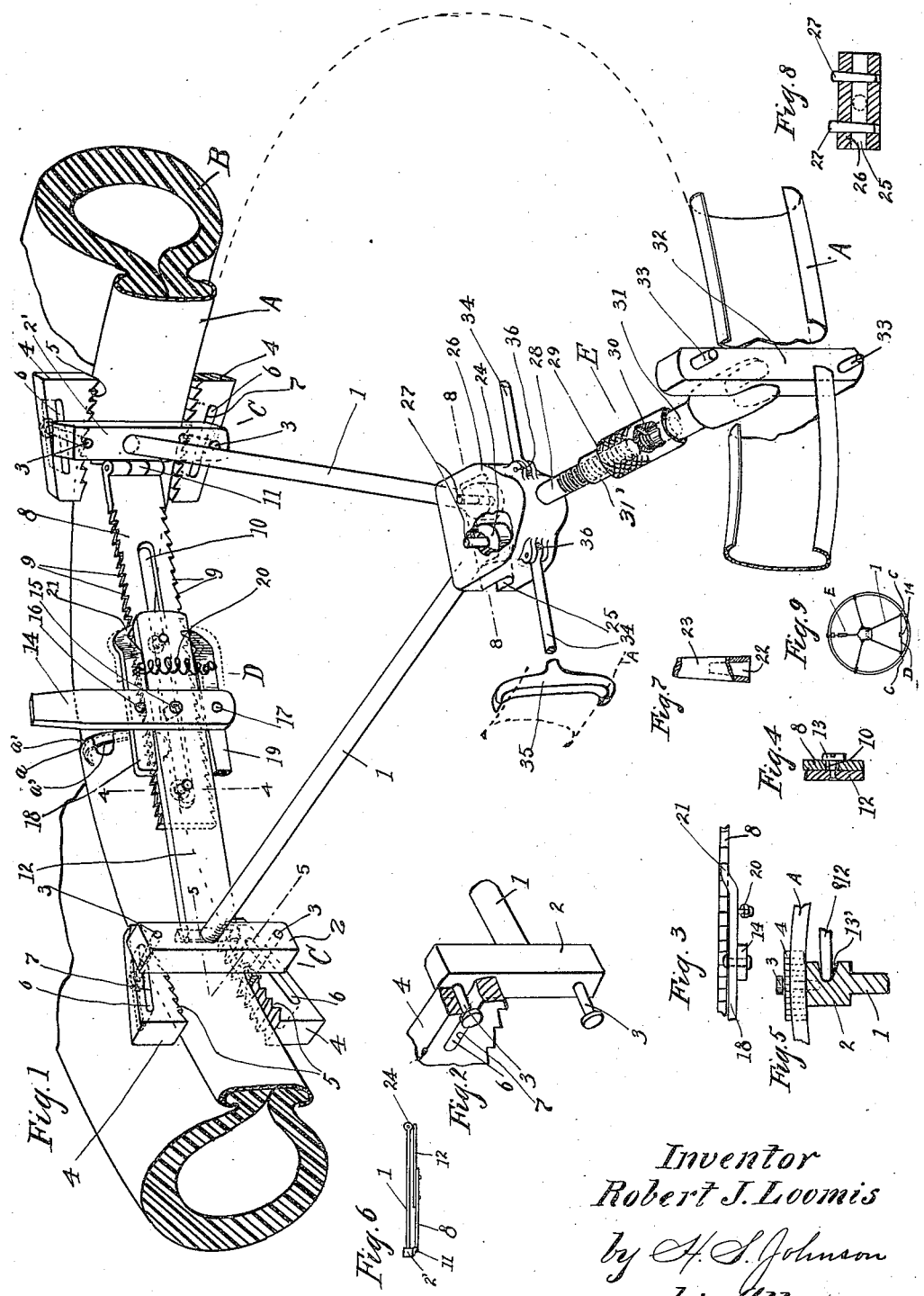

ROBERT J. LOOMIS, OF ST. PAUL, MINNESOTA.

RIM-EXPANDING TOOL.

1,426,577. Specification of Letters Patent. Patented Aug. 22, 1922.

Application filed February 2, 1921. Serial No. 441,951.

*To all whom it may concern:*

Be it known that I, ROBERT J. LOOMIS, a citizen of the United States, residing at St. Paul, in the county of Ramsey and State of Minnesota, have invented certain new and useful Improvements in Rim-Expanding Tools, of which the following is a specification.

This invention relates to devices for expanding straight side and clincher split demountable automobile tire rims, its main object being to provide means for easily bringing the ends, formed by the split, into abutting relation.

A further object is the provision of means, whereby the rim is gripped on opposite sides of its split and close to same, and then expanded in peripheral direction, by the operation of a lever, swingable in a peripheral direction, and positioned in close proximity to the split.

A further object of the invention, is to provide a device of the class described, which will not tend to distort the rim in its application and operation, and which will be cheap of manufacture and so constructed, as to be readily disassembled to form a small package so that it may be conveniently carried among other tools constituting the ordinary equipment.

In the drawings:

Figure 1 is a fragmentary perspective view of a tire rim showing my invention positioned thereon as it appears in operation.

Figure 2 is a fragmentary perspective view of one of the rim gripping elements.

Figure 3 is a top view of a part of the spreading mechanism of the gripping elements.

Figure 4 is a section on line 4—4 of Figure 1.

Figure 5 is a section on line 5—5 of Figure 1.

Figure 6 is a top view drawn to a reduced scale, of an element of the rim gripping and spreading mechanism showing it in detached, folded position.

Figure 7 is a perspective view of the socket end of the detachable operating handle.

Figure 8 is a section on line 8—8 of Figure 1, and

Figure 9 is a diagrammatic view of the device applied to a rim.

A designates a demountable split automobile rim of the clincher type, split at $a$ to form ends $a'—a'$, and B a tire positioned in the channel of the rim. C designates rim gripping elements, and D, spreading mechanism for spreading said elements, to move the ends $a—a$ away from each other. E designates a radially adjustable clamping arm for holding the gripping and spreading mechanism in the plane of the rim. When the invention is positioned for use, the gripping elements C are positioned one on either side of the split, and spaced a distance therefrom, each element C comprising a strut rod 1, extending inwardly in the plane of the rim, said rod being attached to a head 2 on one of said elements and 2' on the other, said head extending transversely across the inner face and beyond opposite sides of the rim A, and having near its outer ends, outwardly extending headed pins 3. Each pin carries slidably, a toothed wedge 4, the teeth 5 thereof resting on the edge of the rim and being directed with the vertical sides away from the split $a$. The wedge is formed with an inclined slot 6, the floor 7 thereof being inclined away from the split, said slot slidably receiving the pin 3, so that when the head 2 is caused to be moved away from the split, the oppositely disposed pins will ride up the inclined floor 7, and thereby crowd the teeth of the respective wedges firmly against opposite edges of the rims. As the teeth are directed away from the split, they will dig into the metal of the rim and thus grip the latter firmly between them. Thus, each gripping element has a set of wedges.

The spreading mechanism D which may be termed step by step mechanism comprises a horizontally disposed long flat double rack-bar 8, the upper and lower long edges thereof formed with teeth 9 the latter having vertical sides directed toward the split $a$. The rack-bar has a longitudinal slot 10, and has hinge connection 11 with the head 2', so that it may be swung in the plane of the rim against the rod 1. Lying slidably flatly against the rack-bar, is the plain bar 12, having spaced headed studs 13 extending with their shanks through the slot 10 of the rack-bar, whereby the latter is slidably connected with the plain bar. The free end of the plain bar loosely pivots in the elongated indent 13' in the side of the head 2. The operating lever 14, has fulcrum-support 15 on the bar 12, and pivotally carries by means of the pivots 16 and 17, the dogs 18 and 19 respectively. The dogs are connected by the coil spring 20, whereby they are constantly drawn toward each other. The dogs are bent outwardly, to bring the nose 21 (Fig. 3) into engagement with the teeth 9 of the rack-bar. As the operating lever 14 is reciprocated, the dogs will alternately engage the teeth on opposite edges of the rack-bar and thereby impart a rectilinear motion to the latter. Thus, the rim gripping elements C, may be forced to move in opposite directions, and as they grip the rim firmly the latter is expanded, whereby the ends $a'—a'$ may be brought into normal abutting relation. The lever 14 is tapered at its free end, to fit the socket 22 of the lever extension 23 (Fig. 7). At their inner ends, the rods 1 are formed with eyes 24, fitting movably into the bifurcation 25 of the block 26 so as to swing in the plane of the rim, said eyes adapted to receive the pivot pins 27, extending at right angles through said bifurcation. The clamping arm E, extends at right angles to said bifurcation and is disposed radially, with respect to the rim, and comprises a stud 28 attached to the block 26, and screw-threadedly fitting the sleeve 29, which latter has pin and groove connection 30, with the shank 31, whereby it may be held revolubly positioned thereon. The sleeve 31' is threaded on the stud 28, and serves as a lock nut to hold the sleeve 29 in set position. The shank 11 is attached to a T head 32 having outstanding pins 33, adapted to loosely receive the rim A between them. By adjusting the sleeve 29, the heads 2 and 2' and the T head 32 may be brought to bear against the inner face of the rim, the pins 33 and the wedges 4, keeping the device positioned in the plane of the rim. To assist in stabilizing the device, I provide the stabilizer arms 34, formed at their free ends with a yoke 35, adapted to embrace the rim. The stabilizer arms have hinge connection 36 with the block 26, enabling them to be swung against the arm E when the device is in a disassembled state.

In Figure 9, is shown, diagrammatically a view of the invention applied to the rim wherein the stabilizer arms are shown in operative position.

I claim:

1. A rim expanding device, comprising a pair of oppositely disposed rim gripping elements, having converging rods extending in the plane of the rim a longitudinally adjustable arm pivotally connected at one end with said rods and extending away from said rim gripping elements to the opposite side of the rim and having means at the other end to embrace the latter, and spreading mechanism extending between said gripping elements and having pivotal connection with both, said spreading mechanism comprising a double rack-bar and a plain bar constructed so as to be longitudinally slidable upon one another, an operating lever having fulcrum support on said plain bar, and spring pressed dogs pivoted on said lever, one for each rack of said double rack-bar, said dogs being pivoted on opposite sides of said fulcrum so as to alternately engage said rack-bar to slide it on said plain bar when said lever is actuated.

2. A rim expanding device, comprising a pair of rim gripping elements having converging rods extending in the plane of the rim, means pivotally connected with said rods so as to swing in the plane of said rim, extending away from said elements to the opposite side of the rim and having means to embrace the latter thereat, and means operatively connected with both of said gripping elements for spreading and holding them spread, said rim gripping elements comprising in part, two sets of oppositely disposed toothed wedges resting with their teeth on opposite edges of the rim, the surface opposite the teeth of each wedge of each set being inclined away from the other set, and a member for each set extending transversely across the inner face of the rim and over and engaging with the said inclined surface.

In testimony whereof I affix my signature.

ROBERT J. LOOMIS.